United States Patent
Niethammer et al.

(10) Patent No.: US 6,371,382 B1
(45) Date of Patent: Apr. 16, 2002

(54) METHOD FOR MACHINING CONTROL EDGES OF A VALVE FOR A FUEL INJECTION DEVICE OF AN INTERNAL COMBUSTION ENGINE AND FUEL INJECTION DEVICE WITH SUCH A VALVE

(75) Inventors: Bernd Niethammer, Nürtingen; Martin Lenk, Chemnitz; Steffen Martin, Niederfrohna, all of (DE)

(73) Assignee: Hydraulik-Ring GmbH (DE)

(*) Notice: Subject to any disclaimer, the term of this patent is extended or adjusted under 35 U.S.C. 154(b) by 0 days.

(21) Appl. No.: 09/450,519

(22) Filed: Nov. 29, 1999

(30) Foreign Application Priority Data

Feb. 23, 1999 (DE) .......................................... 199 07 678

(51) Int. Cl.$^7$ ............................................. B05B 17/00
(52) U.S. Cl. .............................. 239/1; 239/5; 239/88; 239/533.9; 239/585.1; 137/625.65; 29/890.12; 29/890.128
(58) Field of Search ...................... 239/88, 96, 533.2, 239/533.9, 585.1, 585.4, 585.5, 1, 5; 137/625.65; 29/890.12, 890.128

(56) References Cited

U.S. PATENT DOCUMENTS

| | | | |
|---|---|---|---|
| 3,833,988 A | * 9/1974 | Tobias | 29/890.128 |
| 4,588,161 A | * 5/1986 | Adams | 29/890.128 X |
| 5,329,841 A | * 7/1994 | Sauer et al. | 29/890.12 X |
| 5,460,329 A | * 10/1995 | Sturman | 239/96 |
| 5,615,860 A | * 4/1997 | Brehm et al. | 137/625.65 X |
| 5,640,987 A | * 6/1997 | Sturman | 137/625.65 X |
| 6,085,991 A | * 7/2000 | Sturman | 239/88 |

* cited by examiner

Primary Examiner—Steven J. Ganey
(74) Attorney, Agent, or Firm—R.W. Becker & Associates; R. W. Becker

(57) ABSTRACT

The invention relates to a method for machining control edges of a valve, preferably of a valve for a fuel injection device of an internal combustion engine, with the fuel injection device having at least one piston with control edges which co-operate with control edges fixedly connected to a valve, wherein respectively co-operating control edges are machined in one single machining operation with the aid of one single tool. The invention also relates to a fuel injection device with a valve which has control edges machined according to this method and which activates at least one injection valve body for closing off nozzle openings, wherein the valve is controlled by a control unit and is equipped with working connections by which a pressure medium is supplied to a control piston for displacing the injection valve body.

11 Claims, 2 Drawing Sheets

METHOD FOR MACHINING CONTROL EDGES OF A VALVE FOR A FUEL INJECTION DEVICE OF AN INTERNAL COMBUSTION ENGINE AND FUEL INJECTION DEVICE WITH SUCH A VALVE

BACKGROUND OF THE INVENTION

The present invention relates to a method for machining control edges of a valve, preferably, of a valve for a fuel injection device of an internal combustion engine, such fuel injection device having at least one piston provided with control edges which co-operate with control edges fixedly connected to a valve. The present invention also relates to a fuel injection device having a valve having control edges manufactured pursuant to the foregoing method and with the aid of which at least one valve body can be activated that can close off nozzle openings.

For a reliable and clean mixture formation within the combustion chamber, internal combustion engines, Diesel engines in particular, require an injection process consisting of several individual injection actions. These injection actions are divided into a pre-injection and a main injection action of the fuel. For producing the pre-injection fuel quantity, a control unit is employed which requires a high-cost electronic control system and which shows energy losses. With injection devices based on the principle of pressure intensification, a very fast-operating and precise pilot valve is required, for the injection process in order to enable the secure intensification of the injection actions. Such pilot valves have to be manufactured with great precision and a complicated structural design and at high costs in order that they can reliably control the pre-injection action as well as the main injection.

Therefore, it is an object of the present invention to provide the method and the fuel injection device of the aforementioned kind such that the valve can be manufactured with high precision at low costs.

SUMMARY OF THE INVENTION

This object is solved with the inventive method by machining the respectively co-operating control edges in one single machining operation with the aid of one single tool. The object is solved with the inventive device by providing the valve to be controllable by a control unit and to be equipped with working connections by means of which a pressure medium is supplied to a control piston by which the valve body can be activated.

With the inventive method, the respectively co-operating control edges are machined in one single operation by a single tool. Since the pairs of the two control edges positioned toward each other are manufactured in one single operation, merely the tolerance of the tool is transferred onto the structural members of the valve provided with the control edges. Thereby, the control edges which are decisive for a high precision of the valve can be manufactured in a simple and inexpensive way. With the inventive fuel injection device, the respective fuel quantity can be injected into the combustion chamber very precisely at the required quantity.

BRIEF DESCRIPTION OF THE DRAWINGS

The object and advantages of the present invention will appear more clearly from the following specification in conjunction with the accompanying schematic drawings in which.

DESCRIPTION OF THE PREFERRED EMBODIMENTS

Figure 1:
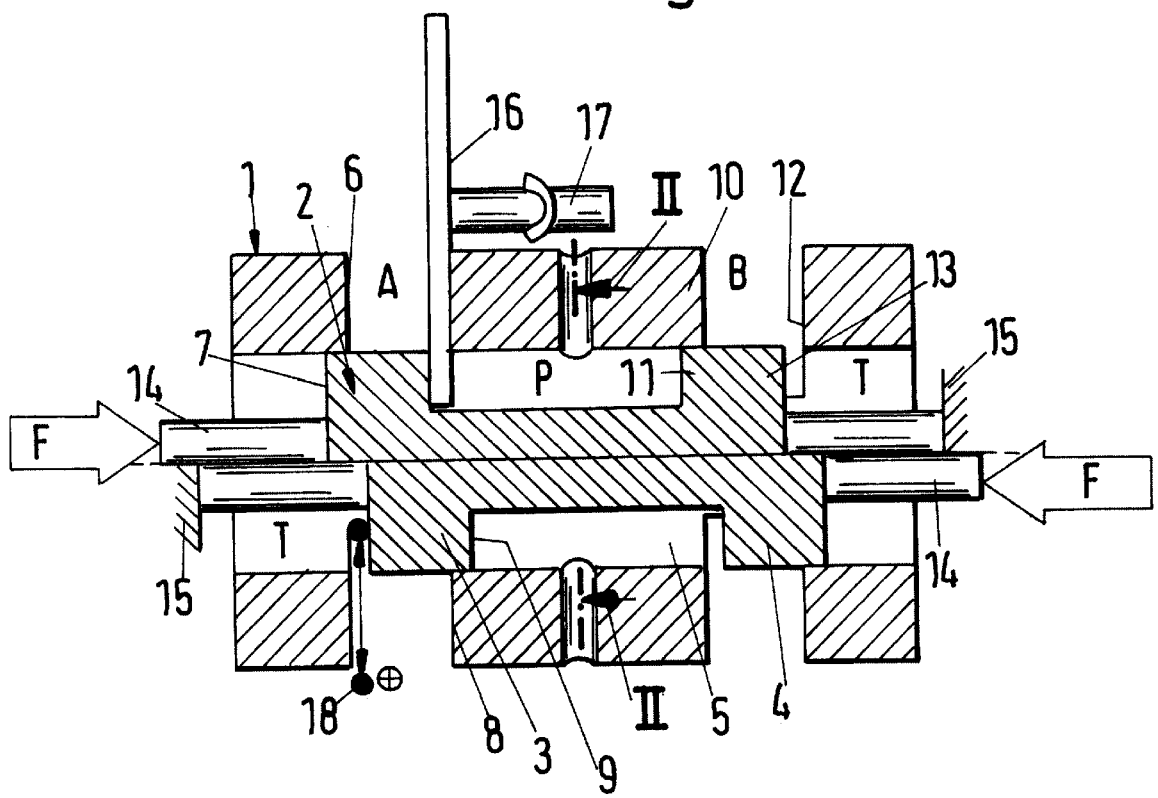
FIG. 1 shows a longitudinal section of a piston and a bushing of an inventive valve, the drawing showing in the upper and the lower half, respectively, different tools for machining of control edges.

The present invention will now be described in detail with the aid of several specific embodiments utilizing FIGS. 1 through 3.

The valve described in the following is advantageously a pilot valve. It has a valve body 21 (FIG. 3) provided with a receiving space into which a bushing 1 is inserted. It is inserted into the receiving space of the valve body 21 by means of a clearance fit, transition fit, or press fit, or it is mechanically detained in a defined position within the valve body 21, e.g., by a stop, a ring, or the like. The bushing 1 has two working connections A and B to which consuming means to be controlled are connected. Furthermore, the bushing 1 is provided with a pressure connection P via which the pressurized hydraulic medium is supplied. The two working connections A, B and the pressure connection P are bore holes within the wall of the bushing 1.

The bushing 1 receives a piston 2 which is axially displaceable within the bushing 1. Each of the ends of the piston 2 is connected to a respective annular stay 3 and 4. Thus, an annular groove 5 is formed between the annular stays 3 and 4. The annular groove 5 forms the connection between the pressure connection P and the working connection A or B, depending on the position of the piston 2.

The annular stays 3, 4 of the piston 2 and the working connections A, B of the bushing 1 co-operate with each other via control edges 6 to 13. They are formed in a known manner by the lateral limiting surfaces of the working connections A, B of the bushing 1 and the annular stays 3, 4 of the piston 2. In order to ensure a proper switching operation of the pilot valve, the control edges must, both, be machined and aligned toward each other with precision.

The machining of the control edges 6 to 9 at the working connection A will described in more detail with the aid of FIG. 1. The control edges 10 to 13 in the area of the other working connection B are manufactured in the same manner.

The respectively co-operating control edges 6, 7 and 8, 9 are each machined simultaneously with one single tool. When the control edges at the bushing 1 and at the piston 2 are machined, the two structural members are axially fixedly positioned and are kept in this position so that they cannot be shifted against each other during the machining process. This is illustrated in FIG. 1 by the force arrow F. The force acts upon a piston rod 14 which is pressed against a fixedly connected stop 15 by the force F. Thus, the piston 2 is fixedly detained during the machining process in a defined position relative to the bushing 1. Also the bushing 1 is axially fixedly detained so that it cannot be shifted during the machining process.

The stop 15 is advantageously adjustable in the axial direction of the piston 2 so that the axial position of the piston 2 can be precisely adjusted relative to the bushing 1. It is, of course, possible to provide the positioning of the bushing 1 to be adjustable.

FIG. 1 illustrates in its upper half that the pair of control edges 8, 9 is simultaneously machined with a grinding disk 16 provided fixedly connected to a shaft which is arranged parallel to the axis of the piston 2. The two control edges 8, 9 are spaced apart in the axial direction with the space corresponding to the thickness of the grinding disk 16. The diameter of the grinding disk 16 is so large that the control edges 8, 9 can be machined along their radial width.

The bushing 1 and the piston 2 are pre-machined and are already provided with the connections A, B, P. Furthermore, they are provided in the area of the control edges to be machined with a slight overmeasure so that the grinding disk 16 can still remove material at the bushing 1 and at the piston 2. The two control edges 8, 9 are simultaneously machined with the grinding disk 16. The rotating grinding disk 16 is moved radially from the outside to the inside and thereby the overmeasure is removed at the bushing 1 and at the piston 2 so that the planar control edges 8, 9 which are thereby created have an exact measure. Since the two control edges 8, 9 which co-operate during the operation of the valve are machined by the grinding disk 16 in one single operation, only the tolerance of the grinding disk 16 transfers to the bushing 1 and the piston 2.

As soon as the control edges 8, 9 of the working connection A are machined, the grinding disk 16 is removed and the piston 2 is displaced axially relative to the bushing 1 into a position as it is illustrated in the lower half of FIG. 1. Now, the control edges 6 and 7 of the bushing 1 and the piston 2 can be machined with the grinding disk 16.

In the same manner, also the pairs of control edges 10, 11 and 12, 13 in the area of the working connection B are machined with the grinding disk 16.

The lower half of FIG. 1 shows schematically that the pairs of control edges can also be machined by an eroding process. This is achieved by moving an eroding wire 18 from the outside to the inside whereby it first machines the control edge at the bushing 1 and subsequently the corresponding control edge at the piston 2. As FIG. 1 shows in its lower half, the corresponding control edges at the bushing 1 and the piston 2 are positioned such toward each other that the corresponding control edges can be machined with the eroding wire 18 in one single operation. All pairs of control edges are machined in this manner.

With the eroding wire 18, the machining process can be performed by the sink or wire eroding process. It is further possible not only to grind the control edges, but, for example, also to mill them.

A pilot valve can be manufactured in a simple and inexpensive way with the machining methods described herein. The pilot valve can be utilized everywhere where high requirements are exacted with respect to the pilot valve. Such high requirements are, for example, exacted with respect to pilot valves which are used in connection with injection devices for combustion engines. In an injection device that is based on the principle of pressure intensification a very fast-operating and precise pilot valve is required for the injection process in order to enable the reliable changeover of the injection actions. With the method described herein, such a pilot valve can be manufactured without difficulty. Because of the machining of the co-operating control edges of each pair of control edges, a precise correspondence of the control edges is ensured. The control edges remain sharp-edged after the machining process at the bushing 1 and the piston 2 so that a reliable operation of the pilot valve is achieved.

With the machining process described herein, all the control edges 7, 9, 11, 13 of the piston 2 are machined with precision.

Figure 2:
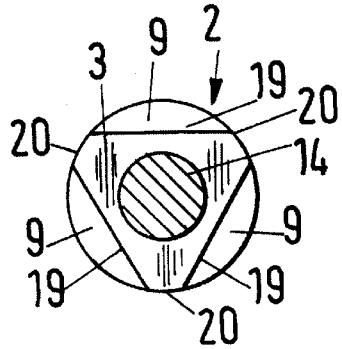
FIG. 2 shows a cross-sectional view along line II—II of FIG. 1.

As can be seen in FIG. 2, the control edges at the piston 2 are provided to be threefold. FIG. 2 illustrates this for the control edges 9 each of which is embodied as a sector of a circle and are provided with a straight bottom 19. In the same manner, the control edges 7, 11, and 13 are provided to be threefold. Accordingly, the tools 16, 18 for machining these control edges are each employed three times at the same radial level for machining the corresponding control edges. The control edges 7, 9, 11, 13 which are each shaped as sectors of a circle are positioned at the circumference of the respective annular stay 3, 4 of the piston 2 and are spaced apart from one another. Thus, unmachined portions 20 remain at the circumference of the annular stays 3, 4. When the piston 2 is inserted into the bushing 1 in a rotated position, this can result in a partial overlap of the control edges 6, 8, 10, 12 at the bushing with the unmachined portions 20 of the piston 2. This unmachined portion 20 of the piston 2 should, therefore, be selected to be so large that the switching operation of the valve, in particular, the opening operation, can always be performed with a sufficiently large cross-section so that hydraulic medium can flow reliably from the pressure connection P toward the respective working connection A or B of the bushing 1. The rotation of the piston 2 within the bushing 1 can occur during operation. However, it is also possible that a disassembling and cleaning of the two structural members 1, 2 occurs after the machining process and subsequently, the piston 2 is inserted into the bushing 1 in a rotated position.

The bushing 1 is provided with a quantity of control edges 6, 8, 10, 12 which corresponds to the quantity of control edges at the piston 2. On machining the control edges by means of the tools 16 or 18, a corresponding rotation of bushing 1 and piston 2 is necessary for each pair of control edges so that the proper tool can machine the control edges located at the same radial level. However, it is, of course, possible not to rotate the bushing and the piston 2, but, instead, to radially remove the tool 16, 18 after machining one of the pairs of control edges and to position it within the same radial level toward the next pair of control edges in order to also machine this pair in the manner described.

The unit consisting of bushing 1 and piston 2 can be mounted into a Diesel or into a gasoline injection device of a combustion engine. This unit can also be integrated into a common pilot valve. The pre-injection action as well as the main injection action of a combustion engine can be controlled by means of such a pilot valve.

The control edges are accessible from the outside so that the proper tools 16, 18 can be advanced toward the respective control edges without any great effort in order to machine them. Subsequent to machining the control edges, the bushing 1 with the piston 2 is mounted in the valve body (not illustrated).

In the embodiment illustrated and described herein, three control edges are provided at each radial level in order to ensure a sufficiently large opening cross-section for the flow of the hydraulic medium without weakening too much the piston 2 or the bushing 1. Particularly when the control slots within the bushing 1 are too large, the connecting stays between adjacent slots could lead to an impermissibly high weakening of the bushing 1. Despite this situation, an embodiment is possible if the bushing 1 or the piston 2 are designed accordingly, in which only a single control edge or only two control edges at the bushing 1 and at the piston 2 are provided at the respective radial level.

Figure 3:
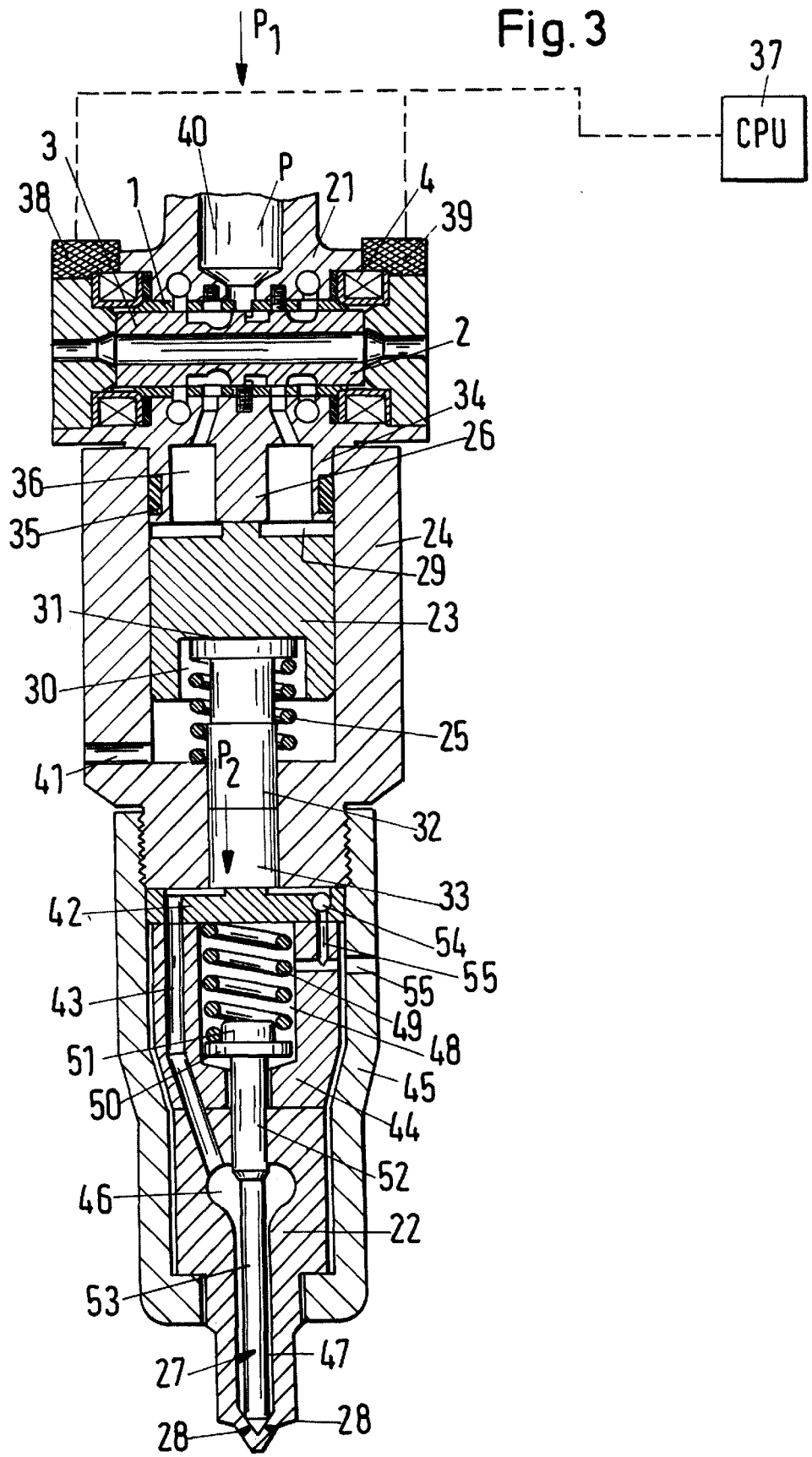
FIG. 3 shows a longitudinal section of a fuel injection device with the inventive valve.

The valve described herein is advantageously a part of a fuel injector as it is exemplarily illustrated in FIG. 3. It has an injection valve 22 by means of which the supply of fuel to a combustion engine, in particular a Diesel engine, is regulated or controlled. The injection device has a control piston 23 which is positioned within a housing 24. When the injection valve 22 is closed, the control piston 23 abuts a second stop 26 under the force of a spring 25. The second stop 26 can be adjustable. It is also possible to provide as a second stop 26 a retaining ring that can be inserted into the housing 24. The control piston 23 is shown in its starting position in which it is displaced by the spring 25 and in which an injection valve body 27 closes off nozzle openings 28. The fuel is conveyed into the combustion chamber via the nozzle openings 28.

The control piston 23 is provided with a piston surface 29 which is pressurized with system pressure. The control piston 23 is provided at its opposite end with a recess bore 30 the bottom 31 of which is abutted by a pressure transferring or intensifying piston 32. It has a smaller diameter than the control piston 23 and projects into a bore 33 of the housing 24. The system pressure $p_1$ is intensified by the pressure intensifying piston 32 creating the larger pressure $p_2$ which acts on the injection valve 22.

The valve is disposed on the housing 24 and projects with a projection 34 of the valve body 21 into the housing 24. Within the wall of this projection 34, at least one seal 35 is provided which seals the projection 34 relative to the housing 24. An annular cavity 36 is provided within the projection 34 and is line-connected to the working connections A, B (FIG. 1) of the valve. The valve is controlled and monitored by a control unit 37. By means of the control unit 37 coils 38, 39 can be supplied with current. The piston 2 which is embodied as an anchor can be displaced by the coils 38, 39 in the desired direction.

When the internal combustion engine is operated the piston 2 is displaced by means of the control unit 37 such that the hydraulic medium which is fed by a line 40 within the valve body 21 is pressurized. The hydraulic medium reaches the annular cavity 36 and acts with the system pressure $p_1$ upon the piston surface 29 of the control piston 23. The recessed area 30 positioned opposite the piston surface 29 is relieved of pressure and is connected to the atmosphere by a bore 41 penetrating the housing 24. Due to this design, the control piston 23 can be displaced against the force of the spring 25. The control piston 23 displaces the pressure intensifying piston 32 whereby the fuel within the bore 33 is pressed into bore channel 43 by a fixedly connected distribution plate 42 The bore channel 43 is provided within an insertion member 44 which is received by a threaded socket member 45. The threaded socket member 45 is screwed onto the housing 24 and receives the injection valve 22 which projects out of the threaded socket member 45. The distribution plate 42 is clamped by means of the threaded socket member 45 between the insertion member 44 and the housing 24.

The bore channel 43 extends from the distribution plate 42 through the insertion member 44 and the injection valve 22 to an injection chamber 46 which is penetrated by the injection valve body 27. An axial bore 47 is provided, adjoining the injection chamber 46 and leading to the nozzle openings 18. The axial bore 47 has a larger diameter than the portion of the injection valve body 27 which projects into the axial bore 47. The injection valve body 27 projects into a central receiving cavity 48 of the insertion member 44. The central receiving cavity 48 is closed off at the opposite side by the distribution plate 42. One end of a compression spring 49 is supported on the distribution plate 42 and its other end rests on a shoulder member 50. The shoulder member 50 is provided at the end portion of the injection valve body 27 that is positioned within the central receiving cavity 48 and has a central projection 51 for centering the compression spring 49. The injection valve body 27 projects with an enlarged valve portion 52 into the injection chamber 46. Within the injection chamber 46 the enlarged valve portion 52 goes over into a thinner end portion 53.

The enlarged valve portion 52 is pressurized by the fuel reaching the injection chamber 46 and the injection valve body 27 is pushed back against the force of the compression spring 49. The nozzle openings 28 are thus released so that the fuel can enter the combustion chamber.

By means of a back pressure valve 54 provided within the distribution plate 42 fuel is taken in from a container (not illustrated) during the return stroke of the pistons 23, 32 through an adjoining channel 55 within the threaded socket member 45 and within the insertion member 44. The fuel reaches the bore 33 via the distribution plate 42 so that the fuel is conveyed to the nozzle openings 28 during the next stroke of the pressure intensifying piston 32 in the manner described. The channel 55 also opens into the central receiving cavity 48. During the return stroke of the pressure intensifying piston 32, the back pressure valve 54 is opened up by the low pressure that is created and fuel is taken in.

The specification incorporates by reference the disclosure of German priority document 199 07 678.2 of Feb. 23, 1999.

The present invention is, of course, in no way restricted to the specific disclosure of the specification and drawings, but also encompasses any modifications within the scope of the appended claims.

What is claimed is:

1. A method for machining control edges of a valve having at least one piston that is provided with control edges which co-operate with control edges fixedly connected to said valve, said method comprising the step of:

machining respectively co-operating ones of said control edges in one single machining operation with the aid of one single tool, wherein said control edges fixedly connected to said valve are at a bushing which receives said at least one piston, and wherein said bushing is inserted into a valve body subsequent to machining said respectively cooperating control edges.

2. A method according to claim 1, wherein said respectively co-operating control edges are machined by said tool simultaneously.

3. A method according to claim 1, wherein said respectively co-operating control edges are machined by said tool successively in time, but in a single operation.

4. A method according to claim 1, wherein said step of machining comprises axially fixedly positioning said bushing and said at least one piston during machining of said respectively co-operating control edges.

5. A fuel injection device with a valve which has control edges machined according to claim 1 and which activates at least one injection valve body for closing off nozzle openings, comprising:

said valve having working connections, said valve provided with said bushing which is received by said valve body;

a control unit for controlling said valve; and a control piston for displacing said injection valve body by means of a pressure medium, wherein said pressure medium is supplied to said control piston by said working connections, wherein said bushing is provided with said at least one piston which is displaced within said bushing, said bushing and said at least one piston are provided with said respectively co-operating control edges which are machined by said one single tool, wherein said control edges provided at said at least one piston are each designed as a sector of a circle.

6. A fuel injection device according to claim 5, wherein said control piston acts upon a pressure intensifying piston which pressurizes said pressure medium for displacing said injection valve body.

7. A fuel injection device according to claim 5, wherein each control edge designed as the sector of a circle is provided at least twice at the respective radial level of said at least one piston.

8. A fuel injection device according to claim 7, wherein at said respective radial level of said at least one piston said at least twice provided control edges each designed as the sector of a circle are adjacent to one another and have a transition into one another via surface portions of said at least one piston where no control edges are provided.

9. A method for machining control edges of a valve having at least one piston that is provided with control edges which co-operate with control edges fixedly connected to said valve, said method comprising the step of:

machining respectively co-operating ones of said control edges in one single machining operation with the aid of one single tool, wherein said respectively co-operating control edges are machined by grinding, and wherein said step of machining comprises positioning said bushing and said at least one piston axially relative to one another such that said respectively co-operating control edges are machined simultaneously by said one single tool comprising respective sides of a grinding wheel.

10. A method for machining control edges of a valve having at least one piston that is provided with control edges which co-operate with control edges fixedly connected to said valve, said method comprising the step of:

machining respectively co-operating ones of said control edges in one single machining operation with the aid of one single tool, wherein said respectively co-operating control edges are machined by an eroding process, wherein said step of machining comprises positioning said bushing and said at least one piston axially relative to one another such that said respectively co-operating control edges are successively machined by said one single tool comprising an eroding wire that is moved from the outside toward the inside.

11. A method for machining control edges of a valve having at least one piston that is provided with control edges which co-operate with control edges fixedly connected to said valve, said method comprising the step of:

machining respectively co-operating ones of said control edges in one single machining operation with the aid of one single tool, wherein the step of machining comprises providing at least two respectively co-operating control edges at said valve and at said piston at one radial level and further comprises spacing apart said-respectively co-operating control edges at a circumference of said bushing and said piston at a same radial level.

\* \* \* \* \*

UNITED STATES PATENT AND TRADEMARK OFFICE
CERTIFICATE OF CORRECTION

PATENT NO.    : 6,371,382 B1  Page 1 of 1
DATED         : April 16, 2002
INVENTOR(S)   : Niethammer et al.

It is certified that error appears in the above-identified patent and that said Letters Patent is hereby corrected as shown below:

Title page,
Item [57], should read as follows:

[57] ABSTRACT:

The invention relates to a method for machining control edges of a valve, preferably of a valve for a fuel injection device of an internal combustion engine, with the fuel injection device having at least one piston with control edges which co-operate with control edges fixedly connected to a valve, wherein respectively co-operating control edges are machined in one single machining operation with the aid of one single tool. The invention also relates to a fuel injection device with a valve which has control edges machined according to this method and which activates at least one injection valve body for closing off nozzle openings, wherein the valve is controlled by a control unit and is equipped with working connections by means of which a pressure medium is supplied to a control piston for displacing the injection valve body.

Signed and Sealed this

Seventeenth Day of September, 2002

*Attest:*

JAMES E. ROGAN
*Attesting Officer*          *Director of the United States Patent and Trademark Office*